(12) United States Patent
Kondo et al.

(10) Patent No.: US 6,442,150 B1
(45) Date of Patent: Aug. 27, 2002

(54) CDMA HANDOFF ARRANGEMENT FOR MOBILE STATION ENCOUNTERING SUDDEN FIELD STRENGTH VARIATIONS AT THE BOUNDARY OF ADJACENT CELLS

(75) Inventors: Seiji Kondo, Saitama; Eiko Kyusai, Kanagawa, both of (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/328,457

(22) Filed: Jun. 9, 1999

(30) Foreign Application Priority Data

Jun. 11, 1998 (JP) .......................................... 10-163869

(51) Int. Cl.[7] ................................................. H04Q 7/20
(52) U.S. Cl. ........................ 370/331; 370/320; 370/335; 455/436; 455/442; 455/561
(58) Field of Search ................................. 455/436, 437, 455/438, 439, 440, 441, 442, 522, 525, 67.1, 68, 561; 370/331–332, 320, 342, 335, 318

(56) References Cited

U.S. PATENT DOCUMENTS

| 5,640,414 | A | * | 6/1997 | Blakeney et al. | ............ 370/332 |
| 6,009,328 | A | * | 12/1999 | Muszynski | ................... 455/436 |
| 6,073,021 | A | * | 6/2000 | Kumar et al. | ................ 370/331 |
| 6,097,954 | A | * | 8/2000 | Kumar et al. | ................ 455/442 |
| 6,101,168 | A | * | 8/2000 | Chen et al. | ................... 370/228 |
| 6,151,502 | A | * | 11/2000 | Padovani et al. | ............ 370/331 |
| 6,285,655 | B1 | * | 9/2001 | Lundby et al. | ............. 370/209 |
| 6,307,849 | B1 | * | 10/2001 | Tiedemann, Jr. | ............ 370/332 |

FOREIGN PATENT DOCUMENTS

| JP | 6-45975 | 2/1994 | |
| JP | 9-191276 | 7/1997 | |
| JP | 9-247085 | 9/1997 | |
| JP | 9-327067 | 12/1997 | |
| JP | 10-145839 | 5/1998 | |
| WO | WO 94/00927 | * 1/1994 | ............ H04B/7/26 |

* cited by examiner

Primary Examiner—William Trost
Assistant Examiner—Simon Nguyen
(74) Attorney, Agent, or Firm—Whitham, Curtis & Christofferson, PC

(57) ABSTRACT

A CDMA base station comprises a convolutional encoder (141) for encoding signals from a base station controller and feeds a variable gain amplifier (142), the signals including a first or a second control message multiplexed with a user signal on a traffic channel assigned to a mobile station. The first control message indicates that a soft handoff operation is initiated and the second control message indicates that the soft handoff operation is being terminated. A control message detector (143) is used to control the variable gain amplifier (142) when the first control message is being encoded by the convolutional encoder so that the gain of the first control message is higher than that of the user signal. A transmitter (150) produces a spread spectrum signal from the output of the amplifier (142) for transmission to the mobile station. As a result, the first control message is transmitted at a power level sufficient to reach the mobile station, which would otherwise fail to receive this message when it encounters a sharp decrease in field intensity.

6 Claims, 4 Drawing Sheets

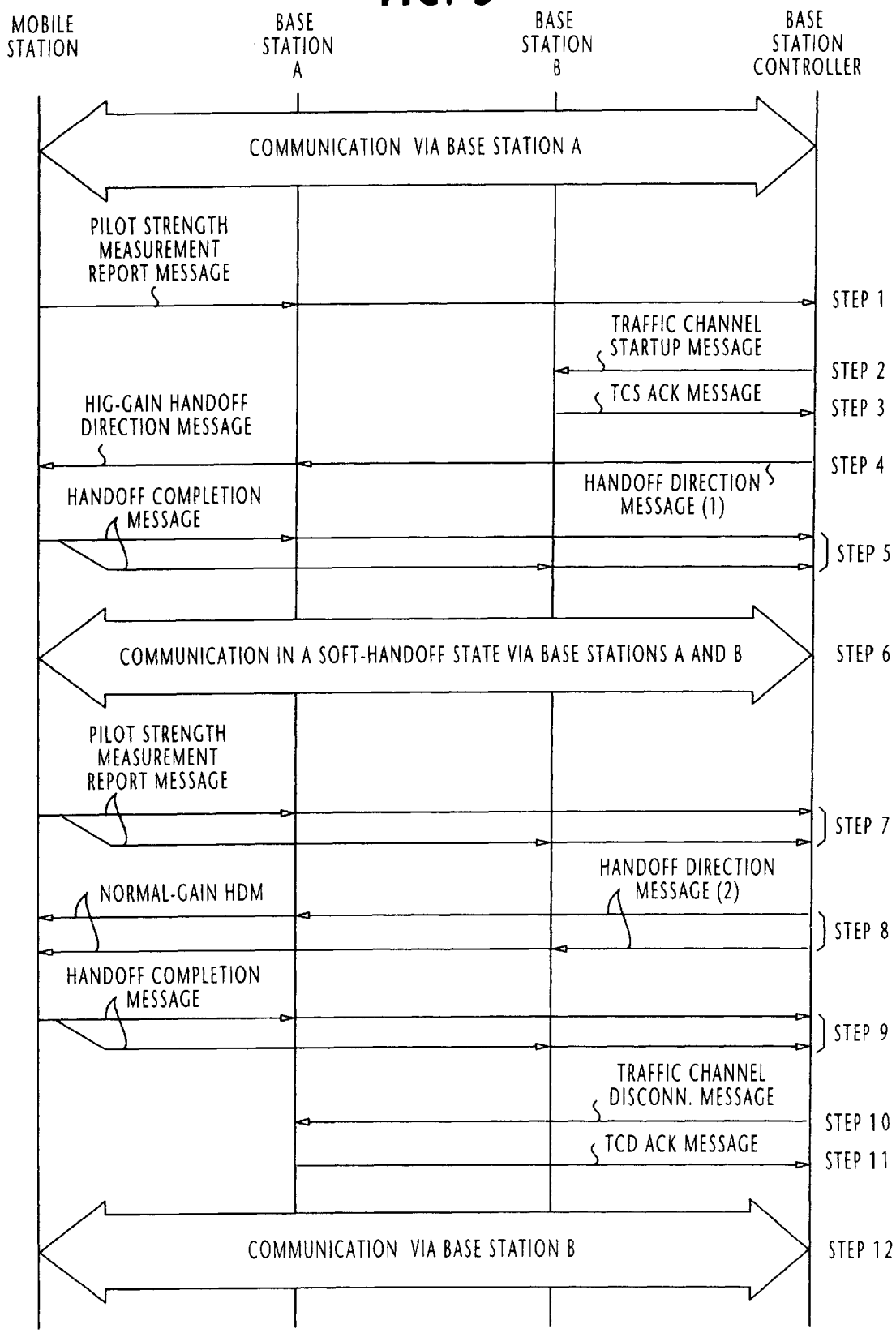

CDMA HANDOFF ARRANGEMENT FOR MOBILE STATION ENCOUNTERING SUDDEN FIELD STRENGTH VARIATIONS AT THE BOUNDARY OF ADJACENT CELLS

BACKGROUND OF THE INVENTION

1. Field of the Invention

The present invention relates generally to cellular mobile communications systems, and more specifically to a base station of a code division multiple access (CDMA) cellular mobile communication network when performing soft handoff for a mobile station which is encountering sudden variations of field strength profiles.

2. Description of the Related Art

In conventional CDMA cellular networks as standardised by the IS-95 standard and adopted by the TIA (Telecommunications Industry Association) and the EIA (Electronic Industries Association), it is the usual practice to share the same frequency by mobile stations and base stations. Two predetermined high and low thresholds respectively called "add" and "drop" thresholds are set in mobile stations. When a mobile station is moving around while communicating with a base station A and entering the coverage of an adjacent base station B, the mobile station is constantly monitoring pilot signals from surrounding base stations and transmits a report message called "Pilot Strength Measurement Report Message" to the base station A at the instant the strength of a surrounding base station's pilot signal exceeds the "add" threshold.

This report message contains identifications of all base stations whose pilot signal strengths at the mobile station are higher than the "add" threshold and the identification of the currently communicating base station. The report message is relayed through the base station A to the base station controller, which responds with a message called "Traffic Channel Startup (TCS) Message" transmitted to the base station B which was listed in the PSM report message (see FIG. 1). When an acknowledgment signal called "Traffic Channel Startup Acknowledgment (TCSA) Message" is received from the base station B, the base station controller directs the base station A to send a Handoff Direction Message to the mobile station, as indicated by steps 1 to 4 in FIG. 1. However, if the mobile station encounters sudden variations in the field strength profiles of the first and second base stations, the Handoff Direction Message from the first base station may not reach the mobile station and its call is dropped.

For example, if a building is located at or near the boundary between the base stations A and B, the transmission from the base station A creates high and low field strength areas on opposite sides of the building and the transmission from the base station B creates high and low field strength profiles which are in reverse to the profiles of the base station A. If the mobile station is changing its location from one side of the building to the other side while communicating with the base station A, the mobile station will encounter a sudden decrease in the field strength of the pilot signal from base station A and a sudden increase in the field strength of the pilot signal from base station B. If the pilot signal from base station B exceeds the "add" threshold as shown in FIG. 2, the mobile station reports the identifications of the base stations A and B to the base station controller via the base station A. After exchanging a Traffic Channel Startup Message and a Traffic Channel Startup Acknowledgment Message with the base station B, the base station controller sends a Handoff Direction Message to the mobile station via the base station A. If the mobile station has moved past the building, the Handoff Direction Message from the base station A will be hindered by the building and not detected by the mobile station.

Therefore, a need exists to provide a handoff operation that can be successfully established even if a mobile station encounters sudden variations in field strength profiles.

Japanese Laid-Open Patent Specification Hei-9-191276 discloses a CDMA base station transceiver. In the prior art CDMA transceiver, the base station has a power control channel for controlling the transmission power of a mobile station so that the transmission power of its control data is higher than that of its speech signal. Since the Handoff Direction Message is not transmitted on this control channel, the prior art technique is not useful for handoff operation.

SUMMARY OF THE INVENTION

It is therefore an object of the present invention to provide a CDMA cell-site base station and a method for performing a soft handoff operation which ensures against a failure which would otherwise occur when a mobile station encounters sudden field strength variations at the cell boundary of adjacent base stations.

According to a first aspect of the present invent ion, there is provided a base station for a CDMA cellular mobile communication network. The base station comprises an encoder for encoding signals from a base station controller, the signals including a first or a second control message multiplexed with a user signal on a traffic channel assigned to a mobile station. The first control message indicates that a soft handoff operation is initiated and the second control message indicates that the soft handoff operation is being terminated. A variable gain amplifier is coupled to the encoder and a transmitter is coupled to the output of the amplifier for transmission of a spread spectrum signal to the mobile station. A control message detector is provided for detecting when the first control message is being encoded by the encoder and controlling the amplifier so that the encoded first control message is amplified with a gain higher than a gain with which the encoded user signal of the traffic channel is amplified. As a result, the first control message is transmitted at a power level sufficient to reach the mobile station, which would otherwise fail to receive this message when it encounters a sharp decrease in field intensity.

According to a second aspect, the present invention provides a method of performing a soft handoff operation in a CDMA cellular mobile communication network, the method comprising the steps of monitoring, at a mobile station communicating with a first base station, first and second pilot signals respectively sent from the first base station and a second base station, transmitting from the mobile station a reporting message indicating an identification of the second base station if the strength of the second pilot signal is higher than a predetermined level, receiving the reporting message at a base station controller via the first base station and exchanging information between the base station controller and the second base station, multiplexing a handoff direction message with a user signal on a traffic channel and transmitting the traffic channel from the base station controller to the first base station, the handoff direction message indicating that a soft handoff is initiated, and retransmitting the handoff direction message and the user signal from the first base station to the mobile station such that the retransmitted message has a power level higher than a power level at which the user signal is transmitted. Responsive to the handoff direction message, a handoff completion message is transmitted from the mobile station to the base station controller via one or both of the first and second base stations.

BRIEF DESCRIPTION OF THE DRAWINGS

The present invention will be described in further detail with reference to the accompanying drawings, in which:

FIG. 5 is a sequence diagram of the operation of the CDMA network of this invention during a soft handoff.

DETAILED DESCRIPTION

Figure 3:
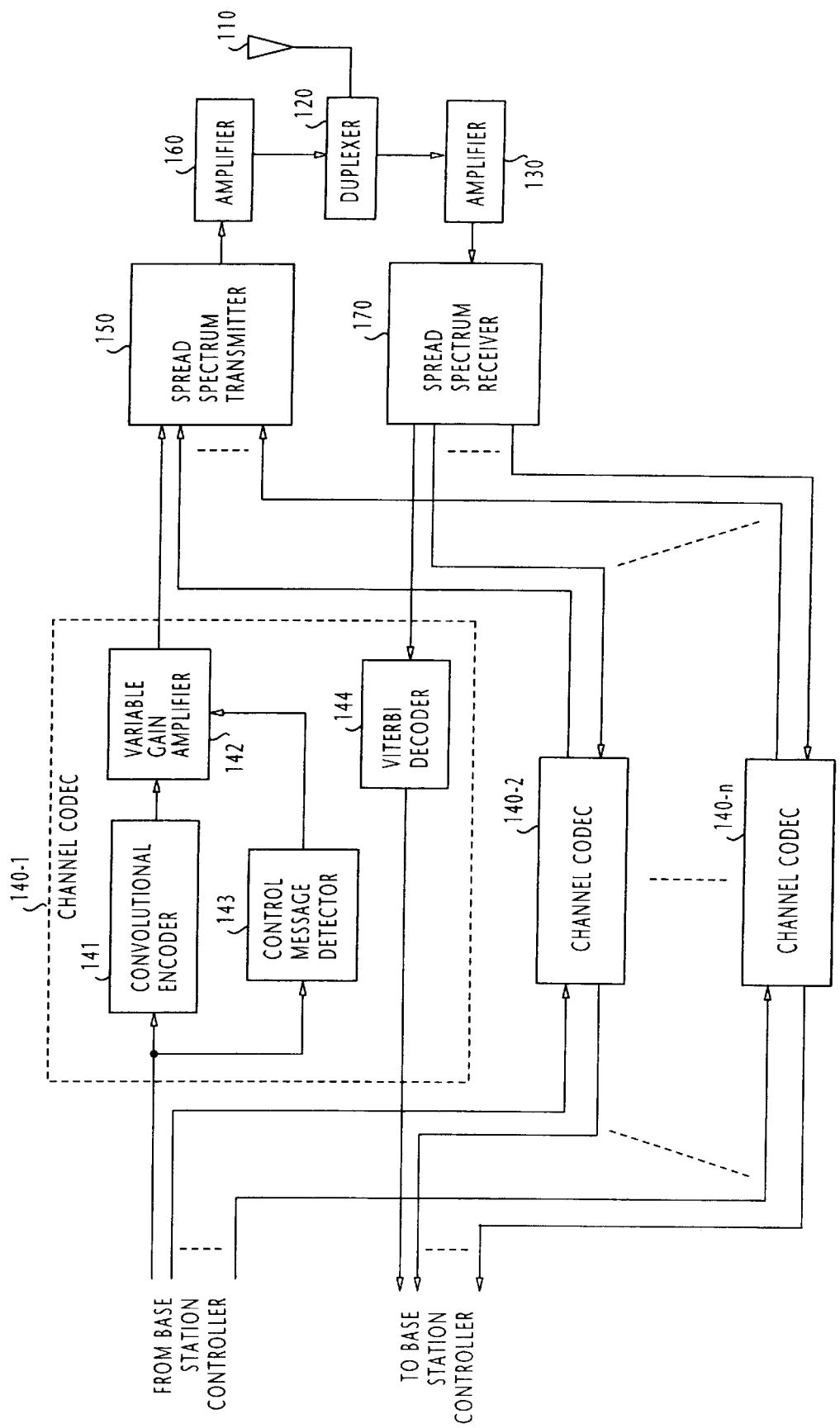
FIG. 3 is a block diagram of a CDMA base station flowchart of the operation of a mobile station according to the present invention.

In FIG. 3, there is shown a CDMA base station according to the present invention. The base station comprises a plurality of channel codecs (coders/decoders) 140-1 through 140-n of identical construction connected to a base station controller, not shown, via land-lines.

Each channel codec 140 includes a convolutional encoder 141 for encoding downlink signals from the base station controller and a variable gain amplifier 142 connected to the output of the convolutional encoder 141. A control message detector 143 is provided for detecting a first Handoff Direction Message that is transmitted from the base station controller when a soft handoff is initiated. Control message detector 143 examines the contents of Handoff Direction Messages not to respond to a second Handoff Direction Message that is transmitted from the base station controller when the soft handoff is being terminated.

When the signal contained in the Forward Traffic Channel is a user signal, the gain control circuit 143 adjusts the gain of amplifier 142 at an appropriate level. When the gain control circuit 143 determines that a first Handoff Direction Message is being encoded by the convolutional encoder 141, it controls the gain of the amplifier 142 so that the encoded message is amplified with a gain higher than a gain at which the user signal of the Forward Traffic Channel is amplified. Typically, the amplitude of the first Handoff Direction Message at the output of amplifier 142 is $2^{1/2}$ times higher than the amplitude of the user signal of the same Forward Traffic Channel at the output of amplifier 142.

The output of the amplifier 142 of each channel codec 140 is supplied to a spread spectrum transmitter 150 where it is spread with a spreading code and combined with other spread signals from other channel codecs. The combined spread signal are used to modulate a carrier and the modulated carrier is amplified by a power amplifier 160 and transmitted from antenna 110 as a forward-channel spread spectrum signal.

Reverse-channel spread spectrum signals from mobile stations are detected by the antenna 110 and coupled through a duplexer 120 to a low-noise amplifier 130 and applied to a spread spectrum receiver 170 where the received signals are demodulated and despread with despreading codes to detect individual user signals. Each of the user signals is supplied to a Viterbi decoder 144 of a corresponding one of the channel codecs 140. The output of the Viterbi decoder 144 of each codec is coupled to the base station controller via a land-line.

The operation of a CDMA mobile communication system of the present invention will be described below with the aid of FIGS. 2, 4 and 5 by assuming that a mobile station 200 communicating with a base station A is travelling towards an adjacent base station B and encountering an obstruction, or building 300 that stands in the transmission path of signals from the base station B to the mobile station 200 when approaching it, the building also standing in the transmission path of signals from the base station A to the mobile station when receding from the building. When the mobile station 200 establishes a call through the base station A, it is constantly monitoring pilot signals from surrounding base stations including the base station A and comparing their field strengths with the "add" threshold (see FIG. 2).

Figure 1:
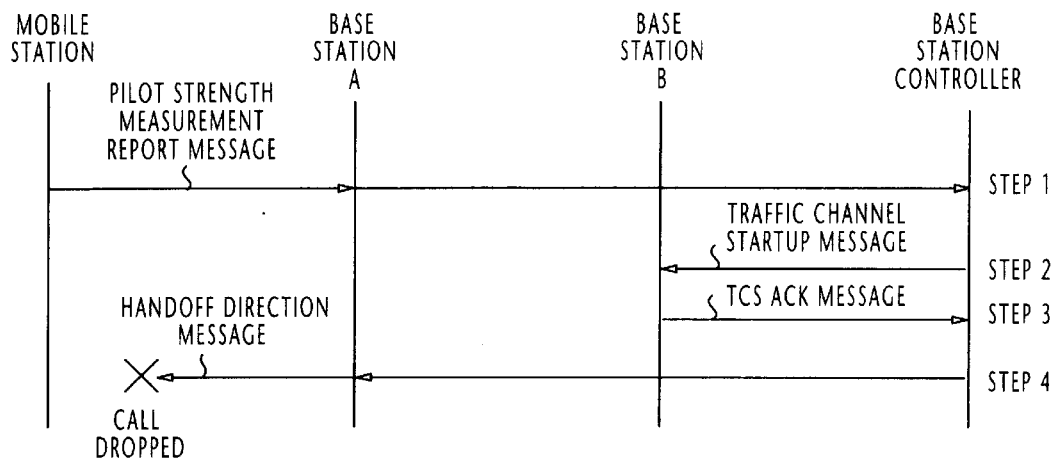
FIG. 1 is a sequence diagram of the operation of a prior art CDMA base station during a soft handoff.
Figure 2:
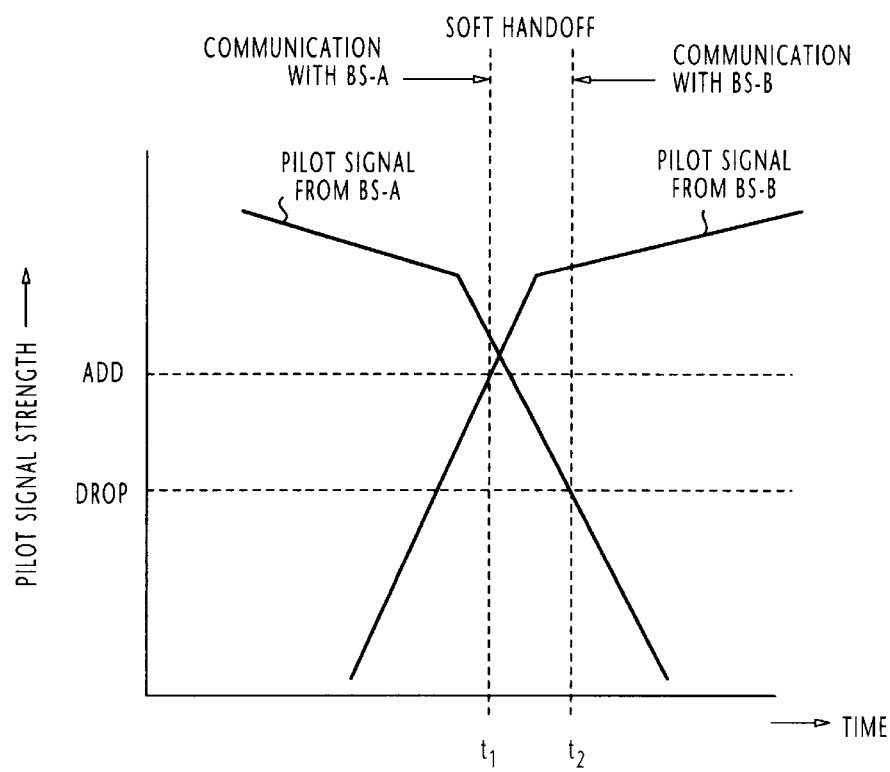
FIG. 2 is a graphic representation of strengths of pilot signals transmitted from base stations of adjacent cells during the handoff when a mobile station encounters sudden variations in field strength profiles.
Figure 4A:
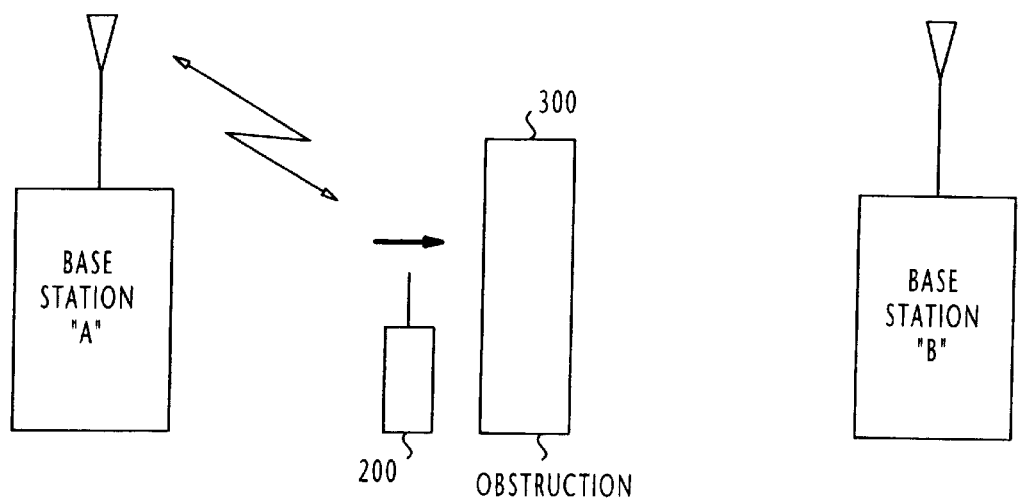
FIGS. 4A and 4B are illustrations of a mobile station moving past an obstacle such as a building structure located between the base stations of adjacent cells.

When the mobile station is approaching the building 200 as illustrated in FIG. 4A, the strength of the pilot signal from the base station B suddenly increases and exceeds the "add" threshold at time $t_1$ (FIG. 2). When this occurs, the mobile station 200 identifies the pilot signals whose strengths are greater than the "add" threshold and sends a PSM (pilot strength measurement) report message to the base station A, which retransmits it to the base station controller (step 1, FIG. 5). The report message contains a candidate list of base stations A and B since the strength of the pilot signal of the base station B at time $t_1$ is higher than the "add" threshold. Thus, the base station B is "added" as a candidate for a possible base station to which the mobile's communication is handed over.

In response, the base station controller sends a Traffic Channel Startup Message to the base station B (step 2), which in turn responds with a Traffic Channel Startup Acknowledgment Message (step 3).

At step 4, the base station controller then transmits a Handoff Direction Message on a Forward Traffic Channel to the base station A indicating a spreading code which will be used by the mobile station 200 for communication with the base station B. This Handoff Direction Message also contains information indicating that a soft handoff is started. At the base station A, the control message detector 143 responds to this Handoff Direction Message for setting the gain of amplifier 142 to a level $2^{1/2}$ times higher than the level adjusted for the amplification of the user signal multiplexed on the same Forward Traffic Channel as described above. A spread spectrum signal of the convolutionally encoded Handoff Direction Message is thus transmitted from the antenna 110 with a power level twice as high as that of the user signal.

Because of the high transmission power, the mobile station 200 is able to detect the first Handoff Direction Message from the base station A and examines its contents. Since a spreading code is contained in the received message, the mobile station 200 sets the received spreading code into its operating parameters and broadcasts a Handoff Completion Message. The Handoff Completion Message is received by the base station controller either via the base station A or B, or both. Base station controller selects one of the Handoff Completion Messages having a higher level (step 5).

The reception of the Handoff Completion Message by the base station controller indicates that the "adding" phase of a soft handoff procedure is successfully completed. The base station controller and the mobile station can communicate with each other in a soft-handoff state via the base stations A and B (step 6).

Figure 4B:
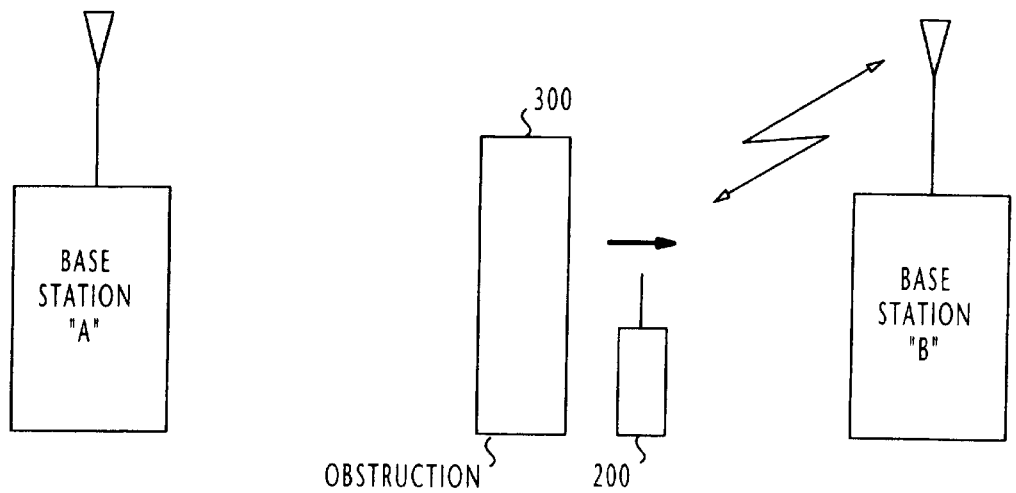

As the mobile station 200 travels further and moves past the building 300 as shown in FIG. 4B, the field strength of the pilot signal from the base station A drops below the "drop" threshold at time $t_2$. When this occurs, the mobile station 200 broadcasts a Pilot Strength Measurement Report Message indicating the identification of a base station whose field strength at the mobile station is lower than the "drop" threshold. Base station controller receives this message either via the base station A or B, or both (step 7). By selecting the stronger signal of the received strength reporting messages, the base station controller knows that the base station A must be dropped from the list of candidates.

A second Handoff Direction Message is sent from the base station controller to the base stations A and B (step 8) to inform that the base station A is to be dropped and the soft handoff operation is being terminated. At each of these base stations, the control message detector 143 does not respond to the second Handoff Direction Message. Therefore, this message is amplified at the same level as the user signal and transmitted from both base stations A and B to the mobile station 200. Since the transmission path of signals from the base station A to the mobile station 200 is almost hindered by the building 300 at time $t_2$, it is likely that the mobile station detects only the Handoff Direction Message from the base station B.

At the mobile station 200, the identification of base station A is deleted from its parameter settings and broadcasts a Handoff Completion Message (step 9). The base station controller receives this broadcast message via the base station B.

In response, the base station controller sends a Traffic Channel Disconnect Message to the base station A in order to terminate its communication with the mobile station 200 (step 10).

At step 11, the base station A responds to the Traffic Channel Disconnect Message by releasing the connection to the mobile station 200 and sends a Traffic Channel Disconnect Acknowledgment Message to the base station controller. This indicates that the "dropping" phase of the soft handoff procedure is complete. Communication between the mobile station 200 and the base station controller only via the base station B is thus established (step 12).

What is claimed is:

1. A base station for a CDMA (code division multiple access) cellular mobile communication network comprising:

an encoder for encoding signals from a base station controller, said signals including a first or a second control message multiplexed with a user signal on a traffic channel assigned to a mobile station, said first control message indicating that a soft handoff operation is initiated and said second control message indicating that the soft handoff operation is being terminated;

a variable gain amplifier coupled to said encoder;

a transmitter coupled to the output of said amplifier for transmission of a spread spectrum signal to said mobile station; and a control message detector for detecting when said first control message is being encoded by said encoder and controlling said amplifier so that said encoded first control message is amplified with a gain higher than a gain with which the encoded user signal of said traffic channel is amplified.

2. The base station of claim 1, wherein each of said first and second control messages is a Handoff Direction Message.

3. The base station of claim 1, wherein said control message detector is not responsive to said second control message.

4. The base station of claim 1, wherein said encoder is a convolutional encoder.

5. A method of performing a soft handoff operation in a CDMA (code division multiple access) cellular mobile communication network, the method comprising the steps of:

a) monitoring, at a mobile station communicating with a first base station, first and second pilot signals respectively sent from the first base station and a second base station;

b) transmitting from the mobile station a reporting message indicating an identification of the second base station if the strength of the second pilot signal is higher than a predetermined level;

c) receiving the reporting message at a base station controller via said first base station and exchanging information between the base station controller and said second base station;

d) multiplexing a handoff direction message with a user signal on a traffic channel and transmitting the traffic channel from the base station controller to the first base station, indicating that a soft handoff is initiated;

e) retransmitting the handoff direction message and the user signal from the first base station to the mobile station such that the retransmitted message has a power level higher than a power level at which the user signal is transmitted; and f) responsive to the handoff direction message, transmitting a handoff completion message from the mobile station to the base station controller via one or both of said first and second base stations.

6. The method of claim 5, wherein the step (e) comprises the steps of:

convolutionally encoding the handoff direction message and the user signal of said traffic channel at the first base station; and amplifying the encoded traffic channel such that the encoded handoff direction message is amplified with a gain higher than a gain with which the encoded user signal is amplified and retransmitting the respectively amplified handoff direction message and user signal from the first base station to the mobile station.

* * * * *